(12) United States Patent
Wang et al.

(10) Patent No.: US 11,139,000 B2
(45) Date of Patent: Oct. 5, 2021

(54) METHOD AND APPARATUS FOR SIGNALING SPATIAL REGION INFORMATION

(71) Applicant: MEDIATEK INC., Hsin-Chu (TW)

(72) Inventors: Xin Wang, San Jose, CA (US); Lulin Chen, San Jose, CA (US); Wang Lin Lai, San Jose, CA (US); Shan Liu, San Jose, CA (US)

(73) Assignee: MediaTek Inc., Hsin-Chu (TW)

(*) Notice: Subject to any disclaimer, the term of this patent is extended or adjusted under 35 U.S.C. 154(b) by 0 days.

(21) Appl. No.: 15/913,738

(22) Filed: Mar. 6, 2018

(65) Prior Publication Data

US 2018/0261254 A1    Sep. 13, 2018

Related U.S. Application Data

(60) Provisional application No. 62/467,860, filed on Mar. 7, 2017.

(51) Int. Cl.
| | | |
|---|---|---|
| G11B 27/32 | (2006.01) | |
| H04N 21/854 | (2011.01) | |
| H04N 21/4728 | (2011.01) | |
| H04N 21/81 | (2011.01) | |
| G11B 27/10 | (2006.01) | |
| G11B 27/34 | (2006.01) | |

(52) U.S. Cl.
CPC ............ *G11B 27/32* (2013.01); *G11B 27/102* (2013.01); *G11B 27/34* (2013.01); *H04N 21/4728* (2013.01); *H04N 21/816* (2013.01); *H04N 21/85406* (2013.01)

(58) Field of Classification Search
CPC ....... G11B 27/32; G11B 27/102; G11B 27/34; H04N 21/00

USPC ........................................................ 386/241
See application file for complete search history.

(56) References Cited

U.S. PATENT DOCUMENTS

| | | | | |
|---|---|---|---|---|
| 8,442,109 B2* | 5/2013 | Wang | ..................... | H04N 19/61 |
| | | | | 375/240.01 |
| 9,554,133 B2 | 1/2017 | Ye et al. | | |

(Continued)

FOREIGN PATENT DOCUMENTS

| | | |
|---|---|---|
| CN | 104885456 A | 9/2015 |
| CN | 104904225 A | 9/2015 |
| WO | WO 2015/197815 A1 | 12/2015 |

OTHER PUBLICATIONS

US 9,819,767 B2, 11/2017, Denoual et al. (withdrawn)

(Continued)

*Primary Examiner* — Loi H Tran
(74) *Attorney, Agent, or Firm* — Wolf, Greenfield & Sacks, P.C.

(57) ABSTRACT

Aspects of the disclosure provide an apparatus that includes interface circuitry and processing circuitry. The interface circuitry is configured to receive signals carrying metadata that associates a region of interest in a first visual view provided by a first visual track with the first visual track and a second visual track that provides a second visual view that is a part of the first visual view. The processing circuitry is configured to parse the metadata, determine, when the region of interest is selected, the second visual track to provide visual data, and generate images for the region of interest based on the visual data from the second visual track.

17 Claims, 7 Drawing Sheets

(56) References Cited

U.S. PATENT DOCUMENTS

| | | | |
|---|---|---|---|
| 9,883,011 B2 | 1/2018 | Denoual et al. | |
| 2004/0242987 A1* | 12/2004 | Liew | A61B 6/482 600/407 |
| 2014/0079126 A1 | 3/2014 | Ye et al. | |
| 2015/0237166 A1* | 8/2015 | Denoual | H04N 21/234327 709/217 |
| 2017/0094269 A1 | 3/2017 | Ye et al. | |
| 2017/0118540 A1* | 4/2017 | Thomas | H04N 21/85406 |
| 2017/0223083 A1* | 8/2017 | Maze | H04L 65/608 |
| 2018/0041610 A1 | 2/2018 | Denoual et al. | |
| 2018/0061002 A1* | 3/2018 | Lee | H04N 19/597 |
| 2018/0220120 A1* | 8/2018 | Watson | H04N 21/23439 |

OTHER PUBLICATIONS

International Search Report and Written Opinion dated Jun. 5, 2018 in PCT/CN2018/078277, 9 pages.

Emmanuel Thomas, "Text of ISO/IEC 23001-10:2015/FDAM 1 Carriage of Spatial Information" ISO/IEC JTC1/SC29/WG11 N16191, Editor, Jun. 2016, pp. 1-4 and cover pages.

"Information Technology—Coding of Audio-Visual Objects—Part 12: ISO Base Media File Format" ISO/IEC 14496-12:2015 (E), Fifth Edition, 2015, 292 Pages.

"Draft Text of ISO/IEC 23009-1 3rd Edition" ISO/IEC JTC1/SC29/WG11 N16467, Systems, Oct. 2016, 676 Pages.

Byeongdoo Choi, et al. "WD on ISO/IEC 23000-20 Omnidirectional Media Application Format" ISO/IEC JTC1/SC29/WG11 N16439, Systems, 2016, 65 Pages.

Shinya Shimizu, et al. "Use Cases and Requirements on Free-Viewpoint Television (FTV) v.2" ISO/IEC JTC1/SC29/WG11 MPEG2015/N15732, Requirements, Oct. 2015, pp. 1-9 and 1-5.

Xin Wang, et al. "Canonicalization of VR Content Flow Process", ISO/IEC JTC1/SC29/WG11 MPEG2016/M39318, MediaTek, Oct. 2016, 7 Pages.

"Draft Text of ISO/IEC 23009-1 3rd Edition" ISO/IEC JTC1/SC29/WG11 N16225, Systems, May 2016, 680 Pages.

Miska M. Hannuksela, "Technologies Under Consideration for ISOBMFF" ISO/IEC JTC1/SC29/WG11 MPEG2016/N16420, Output Document, Oct. 2016, 9 Pages.

Xin Wang, et al. "Deriving Composite Tracks in ISOBMFF" ISO/IEC JTC1/SC29/WG11 MPEG2016/M39971, Media Tek, Jan. 2017, 9 Pages.

* cited by examiner

METHOD AND APPARATUS FOR SIGNALING SPATIAL REGION INFORMATION

INCORPORATION BY REFERENCE

This present disclosure claims the benefit of U.S. Provisional Application No. 62/467,860, "Methods of Carriage and Signaling of 2-Dimensional Spatial Region Information in ISOBMFF" filed on Mar. 7, 2017, which is incorporated herein by reference in its entirety.

TECHNICAL FIELD

The present disclosure describes embodiments generally related to video coding method and apparatus, and more particularly related to multi-track visual data processing technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Visual content can include global visual data and regional visual data for particular purpose. In an example of visual content for a road bicycle race event, the visual content includes panorama view of a main group of riders, and also includes tracking views of subsets of riders in the main group. The tracking views provide regions of interest for viewers that are interested in, for example, particular riders.

SUMMARY

Aspects of the disclosure provide an apparatus that includes interface circuitry and processing circuitry. The interface circuitry is configured to receive signals carrying metadata that associates a region of interest in a first visual view provided by a first visual track with the first visual track and a second visual track that provides a second visual view that is a part of the first visual view. The processing circuitry is configured to parse the metadata, determine, when the region of interest is selected, the second visual track to provide visual data, and generate images for the region of interest based on the visual data from the second visual track.

According to an aspect of the disclosure, the processing circuitry is configured to request and receive the visual data of the second visual track from another apparatus via the interface circuitry.

In an embodiment, the interface circuitry is configured to receive the signals carrying the metadata that associates the region of interest with multiple second visual tracks that provide respective partial visual views of the first visual view.

In an example, the interface circuitry is configured to receive the signals carrying the metadata that associates multiple regions of interest with the second visual track that provides the second visual view. The processing circuitry is configured to determine, when one of the multiple regions of interest is selected, the second visual track to provide the visual data.

In an embodiment, the interface circuitry is configured to receive the signals carrying a metadata track that references to the first visual track, and includes an identifier of the second visual track, and an identifier of the region of interest. In an example, the interface circuitry is configured to receive the signals carrying the metadata track that includes the identifier of the second visual track and the identifier of the region of interest in at least one of a sample and a sample entry for multiple samples.

In another embodiment, the interface circuitry is configured to receive the signals carrying a metadata track that references to the second visual track, and includes an identifier of the region of interest, and an identifier of the first visual track. In an example, the interface circuitry is configured to receive the signals carrying the metadata track that includes the identifier of the region of interest and the identifier of the first visual track in at least one of a sample and a sample entry for multiple samples.

Aspects of the disclosure provide an apparatus that includes processing circuitry and memory circuitry. The processing circuitry is configured to form a first visual track of visual data for a first visual view, and a second visual track of visual data for a second visual view that is a part of the first visual view, determine metadata that associates a region of interest in the first visual view with the first visual track and the second visual track and encapsulate the metadata with the first visual track and the second visual track in a file. The memory circuitry is configured to store the file.

Aspects of the disclosure provide a method. The method includes receiving, by interface circuitry of an apparatus, signals carrying metadata that associates a region of interest in a first visual view provided by a first visual track with the first visual track and a second visual track that provides a second visual view that is a part of the first visual view, parsing, by processing circuitry of the apparatus, the metadata, determining, when the region of interest is selected, the second visual track to provide visual data, and generating images for the region of interest based on the visual data from the second visual track.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Visual content, such as 2D video and 3D omnidirectional video/360 video content, can be represented as a plurality of media streams over time. The media streams are referred to as tracks, when the media streams are represented or captured in a file format such as ISO base media file format (ISOBMFF). In some embodiments, a visual track includes a sequence of image samples in a temporal order, and the visual track has a spatial attribute, such as a visual view (e.g., a spatial scope of visual data in the visual track), associated with the visual track. For example, a main visual track includes a sequence of image samples (e.g., panorama scene) of a relatively large visual view, and a region visual track includes a sequence of image samples of a region (e.g., a tile scene, a partition, a sub-picture) in the large visual view. A media file can include multiple visual tracks with respective spatial attributes. Various media applications and use cases need to provide visual data for a particular region, and the particular region is referred to as a region of interest (ROI). In various video applications, visual content is requested and delivered as a group of visual tracks. Aspects of the disclosure provide techniques to associate visual tracks with ROI(s) to support ROI related use cases and applications. Specifically, the disclosure provides methods for signaling associations of visual tracks and their ROIs carrying or contributing region visual tracks in ISOBMFF, and in addition signaling timed metadata for ROI carrying or contributing region visual tracks and their associations with individual ROIs, in order to support more ROI-related use cases and requirements. In some examples, the association relationships can include a containing relationship and a contributing relationship. For example, when a visual track contains an ROI (containing relationship), the entire ROI is within the visual view that is provided by the visual track. When a visual track contributes to an ROI (contribution relationship), at least a part of the ROI is within the visual view that is provided by the visual track.

Figure 1:
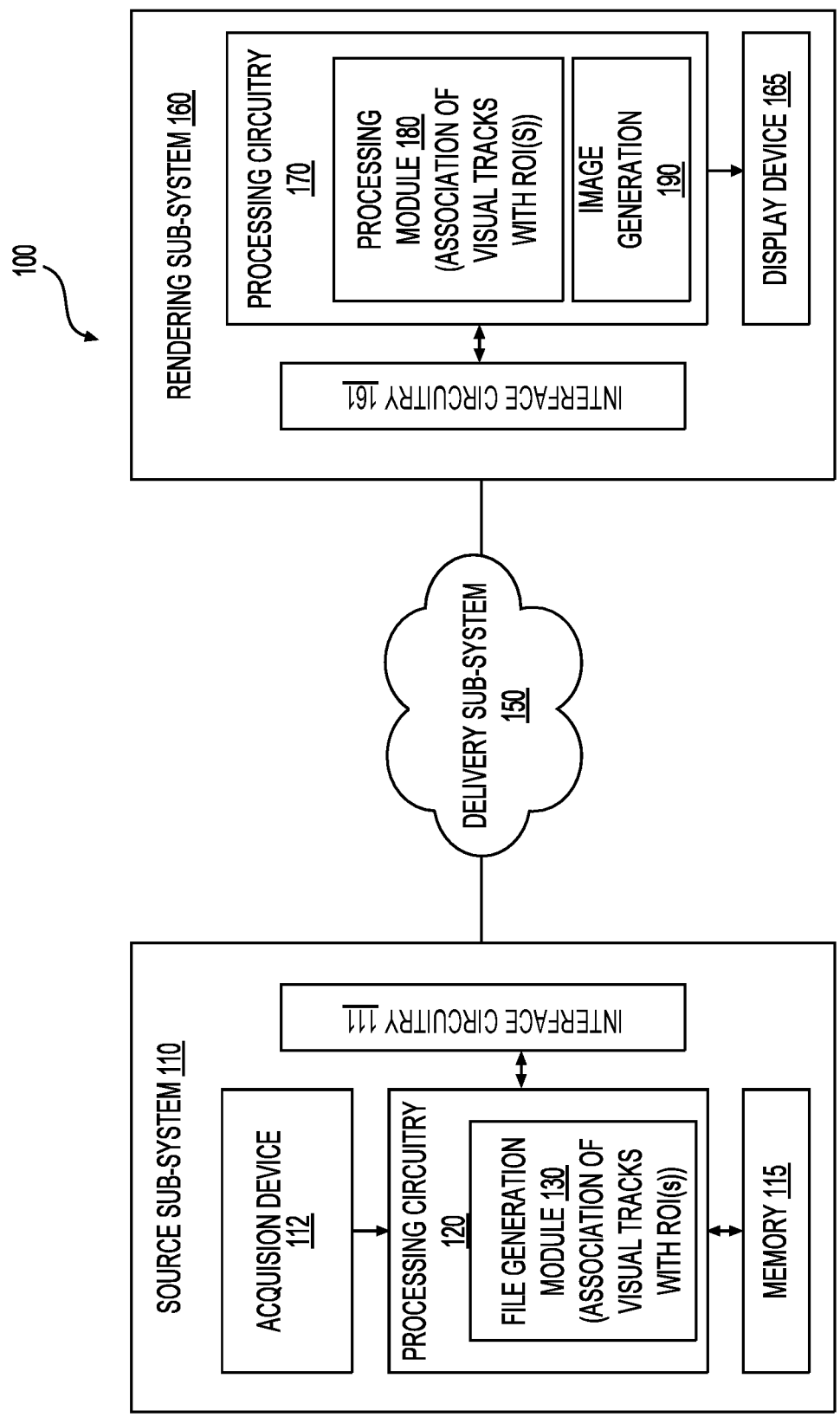
FIG. 1 shows a block diagram of a media system 100 according to an embodiment of the disclosure.

FIG. 1 shows a block diagram of a media system 100 according to an embodiment of the disclosure. The media system 100 includes a source sub-system 110, a delivery sub-system 150 and a rendering sub-system 160 coupled together. The source sub-system 110 is configured to acquire media data (e.g., virtual reality video) and suitably encapsulate the media data into one or more files. The delivery sub-system 150 is configured to deliver the encapsulated media data from the source sub-system 110 to the rendering sub-system 160. The rendering sub-system 160 is configured to render video according to the media data.

According to an aspect of the disclosure, the source sub-system 110 structures media data into tracks, and each track is formed based on a sequence of samples in a temporal order. In an embodiment, the source sub-system 110 structures visual data (e.g., image data, video data) into visual tracks according to specific attributes, such as spatial partitions, image qualities, encryption modes and the like. Further, the source sub-system 110 constructs metadata that provides information for the visual data and/or visual tracks. For example, the source sub-system 110 constructs metadata that provide association information of ROI(s) to visual tracks. In some embodiments, the source sub-system 110 can construct a metadata track with metadata samples in a temporal order. The metadata samples at a time provide association information of ROI(s) to visual tracks at the time.

According to some embodiments, the source sub-system 110 constructs the metadata track with reference to a specific visual track, and the specific visual track is referred to as a referenced visual track for the metadata track. The source sub-system 100 includes region of interest (ROI) information in the metadata track, and the ROI information includes spatial relationship of the ROI(s) to the visual view of the referenced visual track. Further, the source sub-system 100 includes information that associates the ROI(s) to visual tracks other than the referenced visual track, such as a list of visual tracks that carry visual data for an ROI or contribute to the ROI.

In an embodiment, the source sub-system 100 can construct a main visual track, region visual tracks and a metadata track that references to the main visual track. In an example of visual content for a road bicycle race event, the main visual track includes image samples of a panorama view of a main group of riders, and a specific region visual track includes image samples of a tracking view of a subset of the riders in the main group. Further, the source sub-system 100 constructs the metadata track that references to the main visual track. The metadata track includes spatial relationship of an ROI to a visual view of the main visual track and specifies in the metadata track that the ROI is carried by the specific region visual track.

In another example, the main visual track includes timed image samples of a large visual view and the region visual tracks include timed image samples of spatial partitions of the large visual view. Further, the source sub-system 100 constructs the metadata track that references to the main visual track. The main visual track contains an ROI. The metadata track includes spatial relationship of the ROI to visual view of the main visual track and, specifies in the metadata track, region visual tracks that contribute to the ROI. The metadata track can include the ROI information at different levels, such as a sample level, a sample entry level and the like. A sample entry corresponds to multiple samples in a temporal duration. In an example, the metadata track includes timed metadata samples, and a metadata sample at a time describes spatial attributes, such as positions, sizes of the ROI at the time with reference to the main visual track, and a list of identifiers for region visual tracks that contribute to the ROI. In another example, when the position and size of the ROI do not change for a temporal duration, the ROI information can be included in a sample entry for the temporal duration.

In an embodiment, the source sub-system 100 constructs one metadata track for one ROI. In another embodiment, the source sub-system 100 constructs one metadata track for multiple ROIs. In an example, the source sub-system 100 can construct a main visual track that contains the multiple ROIs, multiple region visual tracks, and a metadata track that references to the main visual track to include ROI information for the multiple ROIs. For example, for each ROI that is identified by an identifier, the metadata track includes spatial relationship of the ROI to visual view of the main visual track, and specifies in the metadata track, a list of region visual tracks that contribute to the ROI. Similarly, the metadata track can include the ROI information at different levels, such as a sample level, a sample entry level and the like. For example, when the relative spatial relationship of the ROI to the referenced visual track does not change in a temporal duration, the metadata track can include the ROI information in a sample entry for the temporal duration; and when the relative spatial relationship of the ROI to the referenced visual track changes over time, the metadata track can include the ROI information in respective metadata samples at the sample level.

It is noted that, in some embodiments, the source sub-system 100 can construct the metadata track with reference to a region visual track. In an example, the source sub-system 100 can construct a main visual track, region visual tracks, and a metadata track that references to a specific region visual track. The metadata track includes ROI information with reference to the specific region visual track. For example, the metadata track includes spatial relationship of an ROI with reference to the visual view of the specific region visual track. In an example, when the metadata track for the ROI references to a specific region visual track, the specific region visual track contributes to image generation for the ROI. The metadata track can include ROI information for multiple ROIs. The ROI information can be included at the sample level and the sample entry level.

As disclosed in the provisional application, more specifically, when there are (region) visual tracks, $v_1, \ldots, v_n$, $n \geq 0$, that comprise, contribute or relate to content of ROIs, $R_1, \ldots, R_k$, $k \geq 1$, in a (main) visual track v, the disclosure provides effective mechanisms to signal for the additional use cases in the following situations where the referenced visual track is either the (main) visual track v containing the ROIs or a (region) visual track $v_i$, $1 \leq i \leq n$, contributing to the ROIs:

1. A main visual content containing a single ROI: the timed metadata track m signals that the referenced (main) visual track v contains an ROI defined by its 2D Cartesian coordinates, identified by an ROI identifier id, and contributed by (or carried in) the visual tracks $v_1, \ldots, v_n$.

Note that, when n=0, the metadata track does not signal any region visual track carrying the ROI content, which reduces back to the use case currently supported by the ISO/IEC 23001-10 standard for example. Also note that the "close-up view (video in video)" use case in the standard is a special case of this, where the ROI video is contributed by and only by a region video track.

2. A main visual content containing multiple ROIs: the timed metadata track m signals that the referenced (main) visual track v contains a number of ROIs, each of which is defined by its 2D Cartesian coordinates, identified by an ROI identifier id, and carried in a number of visual tracks $v_1, \ldots, v_n$.

3. A region visual content contributing to a single ROI: the timed metadata track m' signals that the referenced (region) visual track v' contributes to an ROI, identified by an ROI identifier id, of a (main) visual track v, and the contribution portion from v' is defined by the 2D Cartesian coordinates of both the ROI and the track v' itself.

Note one could define ROIs in terms of regions, in that any region is either entirely belonging to an ROI or not contributing to the ROI at all. In this case, the signalling of the contribution portion could be omitted. Also note that the main visual track v is signaled for the purposes of ensuring the uniqueness of, as well as easily locating, the ROI that the region visual track contributes to. If the identification of the ROI can be made unique and easily accessible, the signaling of the main visual track v can also be omitted.

4. A region visual content contributing to multiple ROIs: the timed metadata track m' signals that the referenced (region) visual track v' contributes to a number of ROIs, and for each contributed ROI identified by an ROI identifier id, of a (main) visual track v, the contribution portion from v' is defined by the 2D Cartesian coordinates of both the ROI and the track v' itself.

According to an aspect of the disclosure, the metadata track constructed by the source sub-system 110 provides feasible and two-way associations between ROI containing (main) visual tracks and ROI contributing (region) visual tracks, through their respectively associated timed metadata tracks. Thus, easy access and switching can be achieved from one type of tracks to another, for the purposes like ROI processing, storing, delivering, annotating and rendering.

In some embodiments, the disclosed techniques can be used for signalling hierarchical ROIs, where ROIs can have their own ROIs. In those situations, an ROI contributing region visual track can also be an ROI containing main visual track, and one or more timed metadata tracks can be used to signal ROIs it contributes to and one or more timed metadata tracks to signal ROIs it contains.

It is noted that the names of the sample entry types and the classes defined in this disclosure are illustrative, and their definitions can be optimized and made more compact, especially when some factors can be omitted, fixed and assumed as constant or time-invariant.

In the FIG. 1 example, the source sub-system 110 includes an acquisition device 112, a processing circuitry 120, a memory 115, and an interface circuitry 111 coupled together.

The acquisition device 112 is configured to acquire various media data. In an example, the acquisition device 112 is configured to acquire visual content for a road bicycle race event, such as a panorama view of a main group of riders and tracking views of subsets of riders in the main group. In another example, the acquisition device 112 is configured to acquire images, sound, and the like of 2D video and/or 3D omnidirectional video/360 video. The acquisition device 112 can have any suitable settings. In an example, the acquisition device 112 includes a Peloton cam for panorama view and tracking cams for tracking views. In another example, the acquisition device 112 includes a camera rig (not shown) with multiple cameras, such as an imaging system with two fisheye cameras, a tetrahedral imaging system with four cameras, a cubic imaging system with six cameras, an octahedral imaging system with eight cameras, an icosahedral imaging system with twenty cameras, and the like, configured to take images of various directions in a surrounding space.

In an embodiment, the images taken by the cameras are overlapping, and can be stitched to provide a larger coverage of the surrounding space than a single camera. In an example, the images taken by the cameras can provide 360° sphere coverage of the whole surrounding space. It is noted that the images taken by the cameras can provide less than 360° sphere coverage of the surrounding space.

The media data acquired by the acquisition device 112 can be suitably stored or buffered, for example in the memory 115. The processing circuitry 120 can access the memory 115, process the media data, and encapsulate the media data in suitable format. The encapsulated media data is then suitably stored or buffered, for example in the memory 115.

In an embodiment, the processing circuitry 120 includes an audio processing path configured to process audio data, and includes an image/video processing path configured to process image/video data. The processing circuitry 120 then encapsulates the audio, image and video data with metadata according to a suitable format.

In an example, the images acquired by the acquisition device 112 are two-dimension (2D) images. In another example, on the image/video processing path, the processing circuitry 120 can stitch images taken from different cameras together to form a stitched image, such as an omnidirectional image, and the like. Then, the processing circuitry 120 can project the omnidirectional image according to suitable 2D plane to convert the omnidirectional image to 2D images that can be encoded using 2D encoding techniques. Then the processing circuitry 120 can suitably encode the image and/or a stream of images.

It is noted that the processing circuitry 120 can project the omnidirectional image according to any suitable projection technique. In an example, the processing circuitry 120 can project the omnidirectional image using equirectangular projection (ERP). The ERP projection projects a sphere surface, such as omnidirectional image, to a rectangular plane, such as a 2D image, in a similar manner as projecting earth surface to a map. In an example, the sphere surface (e.g., earth surface) uses spherical coordinate system of yaw (e.g., longitude) and pitch (e.g., latitude), and the rectangular plane uses XY coordinate system. During the projection, the yaw circles are transformed to the vertical lines and the pitch circles are transformed to the horizontal lines, the yaw circles and the pitch circles are orthogonal in the spherical coordinate system, and the vertical lines and the horizontal lines are orthogonal in the XY coordinate system.

In another example, the processing circuitry 120 can project the omnidirectional image to faces of platonic solid, such as tetrahedron, cube, octahedron, icosahedron, and the like. The projected faces can be respectively rearranged, such as rotated, relocated to form a 2D image. The 2D images are then encoded.

It is noted that, in an embodiment, the processing circuitry 120 can encode images taken from the different cameras, and does not perform the stitch operation and/or the projection operation on the images.

According to an aspect of the disclosure, the processing circuitry 120 is configured to encapsulate the visual content into multiple visual tracks, and construct metadata tracks with regard to respective referenced visual tracks. The metadata tracks include ROIs, and associate the ROIs to visual tracks other than the referenced visual tracks.

According to an aspect of the disclosure, the processing circuitry 120 includes a file generation module 130 configured to encapsulate visual tracks and metadata tracks in files. In an embodiment, the processing circuitry 120 is configured to use an extensible format standard, such as ISO base media file format (ISOBMFF) and the like for time-based media, such as video and/or audio. In an example, the ISO base media file format defines a general structure for time-based multimedia files, and is flexible and extensible that facilitates interchange, management, editing and presentation of media. The ISO base media file format is independent of particular network protocol, and can support various network protocols in general. Thus, in an example, presentations based on files in the ISO base media file format can be rendered locally, via network or via other stream delivery mechanism.

Generally, a media presentation can be contained in one or more files. One specific file of the one or more files includes metadata for the media presentation, and is formatted according to a file format, such as the ISO base media file format. The specific file can also include media data. When the media presentation is contained in multiple files, the other files can include media data. In an embodiment, the metadata is used to describe the media data by reference to the media data. Thus, in an example, the media data is stored in a state agnostic to any protocol. The same media data can be used for local presentation, multiple protocols, and the like. The media data can be stored with or without order.

The ISO base media file format includes a specific collection of boxes. The boxes are the logical containers. Boxes include descriptors that hold parameters derived from the media content and media content structures. The media is encapsulated in a hierarchy of boxes. A box is an object-oriented building block defined by a unique type identifier.

In an example, the presentation of media content is referred to as a movie and is divided into tracks that are parallel in term of time. Each track represents a timed sequence of samples of media content. Media content are stored and accessed by access units, such as frames, and the like. The access unit is defined as the smallest individually accessible portion of data within an elementary stream, and unique timing information can be attributed to each access unit. In an embodiment, access units can be stored physically in any sequence and/or any grouping, intact or subdivided into packets. The ISO base media file format uses the boxes to map the access units to a stream of samples using references to byte positions where the access units are stored. In an example, the sample information allows access units to be decoded and presented synchronously on a timeline, regardless of storage.

According to an aspect of the disclosure, the processing circuitry 120 is configured to include ROI information in a metadata track that references to a referenced visual track. The ROI information includes ROI spatial information with reference to the visual view of the referenced visual track, and includes carrier (e.g., visual tracks that carry visual data for the ROI) or contributor (e.g., visual tracks that contribute visual data to the ROI) information by visual tracks. In an embodiment, the processing circuitry 120 is configured to use a track box to include metadata that references to a referenced visual track. For example, the processing circuitry 120 uses a track box to include ROI metadata samples that references to the referenced visual track. The processing circuitry 120 can include description of attributes, such as identifier(s) for ROI(s), 2D Cartesian coordinates of the ROI(s), a list of identifiers for visual tracks, and the like at the metadata sample level or metadata sample entry level in the metadata track.

Further, according to an aspect of the disclosure, the processing circuitry 120 is configured to receive a request of visual data for an ROI, and determine visual tracks that contribute to the ROI based on metadata in a media file. Then, the processing circuitry 120 can provide, for example, the determined visual tracks in response to the request. In an example, the processing circuitry 120 can retrieve visual data of the determined visual tracks, and generate packets to carry the retrieved visual data. Then the interface circuitry 111 can transmit the packets.

Examples of ROI information and file format are shown in FIGS. 2-5, and will be described with regard to FIGS. 2-5.

In an embodiment, the processing circuitry 120 is implemented using one or more processors, and the one or more processors are configured to execute software instructions to perform media data processing. In another embodiment, the processing circuitry 120 is implemented using integrated circuits.

In the FIG. 1 example, the encapsulated media data is provided to the delivery sub-system 150 via the interface circuitry 111. The delivery sub-system 150 is configured to suitably provide the media data to client devices, such as the rendering sub-system 160.

In an embodiment, the delivery sub-system 150 includes various network elements, such as routers, network switches, base stations, access points and the like to form a delivery path between the source sub-system 110 and the rendering sub-system 160. In an example, the source sub-system 110 sends a media presentation to the rendering sub-system 160 via the delivery sub-system 150. The rendering sub-system 160 signals viewport information, for example in the form of an identifier for a ROI, to the source sub-system 110 via the delivery sub-system 150. The viewport information is indicative of ROI that is requested by the rendering sub-system 160. Based on the viewport information, the processing circuitry 120 performs just-in-time processing. For example, the processing circuitry 120 selects suitable visual tracks that contribute to the ROI based on the viewport information, selects suitable image samples based on the temporal duration, and encodes and/or encrypts the selected image samples based on the available bandwidth and encryption mode requirement to generate packets. The delivery sub-system 150 delivers the packets to the rendering sub-system 160. The rendering sub-system 160 then decodes and/or decrypts the packets to reconstruct the image samples for display.

The components of the delivery system 150 are suitably coupled together via wired and/or wireless connections. The delivery system 150 is suitably coupled with the source system 110 and the rendering system 160 via wired and/or wireless connections.

The rendering sub-system 160 can be implemented using any suitable technology. In an example, components of the rendering sub-system 160 are assembled in a device package. In another example, the rendering sub-system 160 is a distributed system, components of the source sub-system 110 can be located at different locations, and are suitable coupled together by wire connections and/or wireless connections.

In the FIG. 1 example, the rendering sub-system 160 includes an interface circuitry 161, a processing circuitry 170 and a display device 165 coupled together. The interface circuitry 161 is configured to suitably receive media information, such as files of media presentation, media stream and the like via any suitable communication protocol.

The processing circuitry 170 is configured to process the media information and generate images for the display device 165 to present to one or more users. The display device 165 can be any suitable display, such as a television, a smart phone, a wearable display, a head-mounted device, and the like.

In an example, the processing circuitry 170 includes a processing module 180 and an image generation module 190. The processing module 180 is configured to perform packet processing, control and communication operations. The image generation module 190 is configured to generate images of the regions of interest. The processing module 180 and the image generation module 190 can be implemented as processors executing software instructions or can be implemented as integrated circuits.

According to an aspect of the disclosure, the rendering sub-system 160 can process metadata that is constructed by the source sub-system 110. In an embodiment, the source sub-system 110 sends a media file to the rendering sub-system 160 via the delivery sub-system 150. The media file includes a metadata track. The metadata track includes relationships of ROI(s) to visual tracks, such as spatial relationship of an ROI with a visual view of a referenced visual track, carrier or contributor relationship of visual tracks with the ROI(s), and the like.

In an embodiment, the processing circuitry 170 can parse the metadata track to extract the relationship of the ROI(S) to the visual tracks. Further, in an example, the processing circuitry 170 can determine, when an ROI is selected, visual tracks that can provide visual data for generating images of ROI. In an example, the processing circuitry 170 can generate a request to request the visual data of the determined visual tracks. The request can be sent out by the interface circuitry 161. The interface circuitry 161 can then receive signals carrying the visual data of the determined visual tracks. Then, the processing circuitry 170 can generate images for the ROI based on the received visual data.

Figure 2:
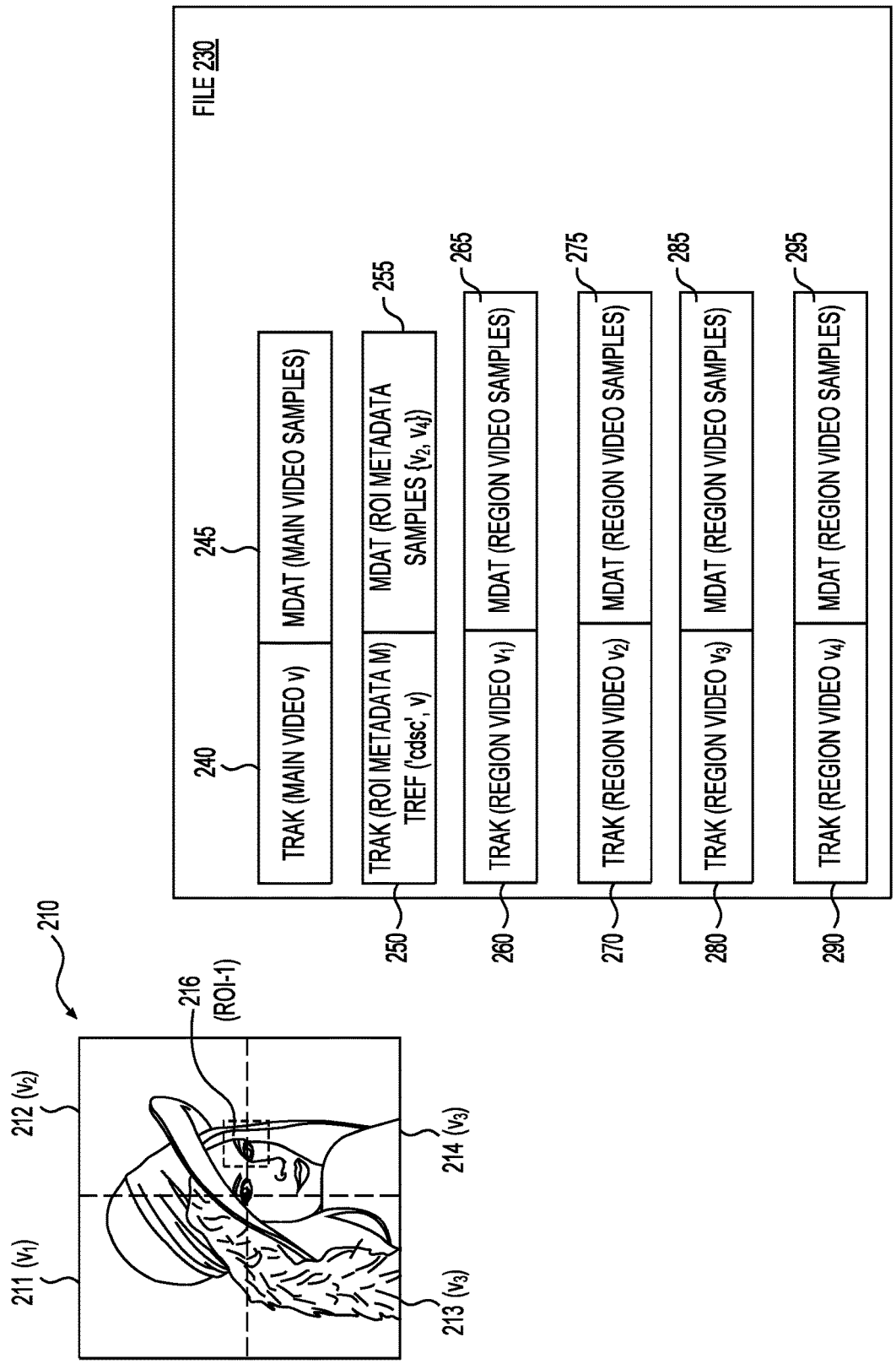
FIGS. 2-5 show diagrams of media files according to some embodiments of the disclosure.

FIG. 2 shows a diagram illustrating a visual content and a corresponding media file 230 according to some embodiments of the disclosure. The visual content includes visual samples of different spatial attributes. For example, the visual content includes visual data for a main visual view 210, four region visual views 211-214, and an ROI 216 (ROI-1). The visual data for the main visual view 210 can form a visual track v that provides video in the main visual view 210. The visual data for the region visual view 211 can form a visual track $v_1$ that provides video in the region visual view 211, the visual data for the region visual view 212 can from a visual track $v_2$ that provides video in the region visual view 212, the visual data for the region visual view 213 can form a visual track $v_3$ that provides video in the region visual view 213, the visual data for the region visual view 214 can form a visual track $v_4$ that provides video in the region visual view 214.

In an example, the ROI 216 is within the main video scope 210, and can move within the main video scope 210. For example, at a time as shown in FIG. 2, a portion of the ROI 216 is in the region visual view 212 and the rest of the ROI 216 is in the region visual view 214. At another time (not shown), the entire ROI 216 can move into the region visual view 212.

As shown in FIG. 2, the file 230 includes track boxes for visual tracks and metadata tracks. For example, the file 230 includes a track box 240 for the main visual track (also referred to as video) v. The track box 240 includes a media box 245 that can include indexes to the main video samples. Similarly, the file 230 includes track boxes 260, 270, 280 and 290 for the region visual tracks $v_1$ to $v_4$. The track box 260 includes a media box 265 that can include indexes to the region video samples for generating the region video $v_1$. The track box 270 includes a media box 275 that can include indexes to the region video samples for generating the region video $v_2$. The track box 280 includes a media box 285 that can include indexes to the region video samples for generating the region video $v_3$. The track box 290 includes a media box 295 that can include indexes to the region video samples for generating the region video $v_4$.

Further as shown in FIG. 2, the file 230 includes a track box 250 of a metadata track m for the ROI 216. The track box 250 includes description to indicate that the referenced visual track of the ROI is the main video v (e.g., tref('cdsc', v)), and main video contains the ROI. The track box 250 includes a media box 255 to include description of the ROI information, such as spatial relationship with reference to the main video v and association to other visual tracks. In some embodiments, the media box 255 includes a sample entry box, and the sample entry box includes indexes to multiple samples. The sample entry box can be used to specify attributes that are common to the multiple samples.

The ROI can be specified at various levels. In an example, when the position and sizes of ROI are static (don't change over time) with reference to the main video v, the ROI can be specified at a sample entry level. For example, the sample entry box specifies the ROI with reference to the main video v and association to other visual tracks. For example, a metadata sample entry box includes an identifier for the ROI 216, position of the ROI 216 in the visual view of the referenced visual track v, sizes of the ROI 216, and a list of visual tracks (e.g., $v_2$ and $v_4$) that contribute to the ROI 216. In an example, the visual view of the referenced visual track is described by sizes of the visual view, such as reference_width, reference_height; the position of the ROI 216 in the visual view is described using coordinates of the top-level corner, such as top_left_x and top_left_y (e.g., assuming the top-level corner of the main visual view 210 is the origin); and the sizes of the ROI 216 is described using width and height.

In another example, when the position and sizes of the ROI changes with reference to the main video v over time, the ROI can be specified at a sample level. For example, a first metadata sample for the time of the image shown in FIG. 2 includes an identifier for the ROI 216, position of the ROI 216 in the main visual view (e.g., coordinates of the top-left corner), sizes of the ROI 216 (e.g., width and height), and a list of visual tracks (e.g., $v_2$ and $v_4$) that contribute to the ROI 216; and a second metadata sample for a different time includes the identifier for the ROI 216, a new position of the ROI 216 in the main visual view (e.g., coordinates of the top-left corner), new sizes of the ROI 216 (e.g., width and height), and a list of visual tracks (e.g., only $v_2$).

The introduction of signaling for a main visual track containing a single ROI, the syntax and semantics for sample entry level description, the syntax and semantics for sample level description are disclosed in the U.S. Provisional Application No. 62/467,860 in the section of "Signaling for a Main Visual Track Containing a single ROI", which is included in the Appendix A.

Figure 3:
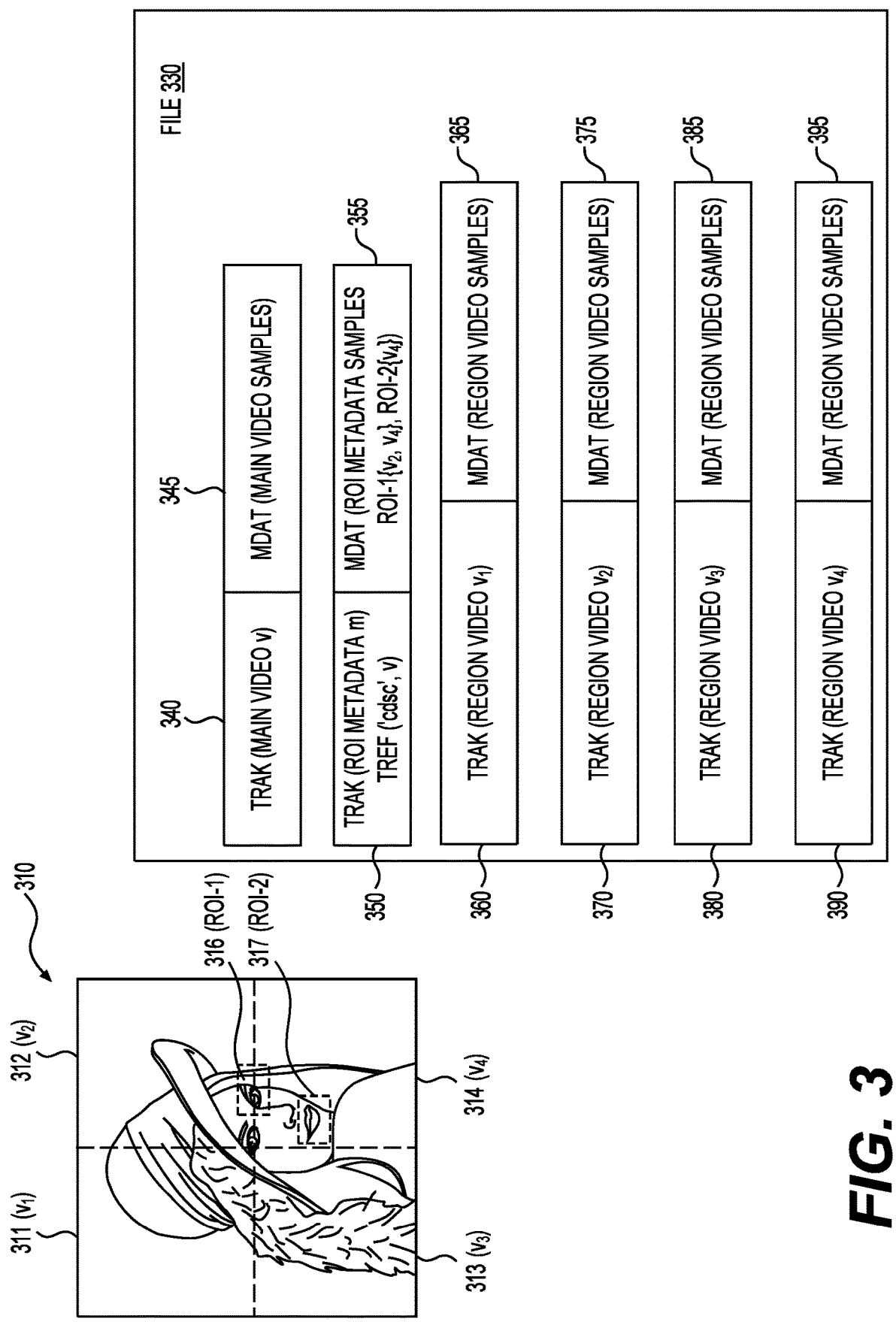

FIG. 3 shows a diagram illustrating a visual content and a corresponding media file 330 according to some embodiments of the disclosure. The visual content includes visual samples of different spatial attributes. For example, the visual content includes visual data for a main visual view 310, four region visual views 311-314, a first ROI 316 (ROI-1) and a second ROI 317 (ROI-2). The visual data for the main visual view 310 can form a visual track v that provides video in the main visual view 310. The visual data for the region visual view 311 can form a visual track $v_1$ that provides video in the region visual view 311, the visual data for the region visual view 312 can from a visual track $v_2$ that provides video in the region visual view 312, the visual data for the region visual view 313 can form a visual track $v_3$ that provides video in the region visual view 313, the visual data for the region visual view 314 can form a visual track $v_4$ that provides video in the region visual view 314.

The ROI 316 and the ROI 317 are within the main video scope 310, and can move within the main video scope 310. For example, at a time, a portion of the ROI 316 is in the region visual view 312 and the rest of the ROI 316 is in the region visual view 314. At another time, the entire ROI 316 can move into the region visual view 312. In another example, the ROI 317 moves within the region visual view 314.

As shown in FIG. 3, the file 330 includes track boxes for visual tracks and metadata tracks. For example, the file 330 includes a track box 340 for the main visual track v. The track box 340 includes a media box 345 that can include indexes to the main video samples. Similarly, the file 330 includes track boxes 360, 370, 380 and 390 for the region visual tracks $v_1$ to $v_4$. The track box 360 includes a media box 365 that can include indexes to the region video samples for generating the region video $v_1$. The track box 370 includes a media box 375 that can include indexes to the region video samples for generating the region video $v_2$. The track box 380 includes a media box 385 that can include indexes to the region video samples for generating the region video $v_3$. The track box 390 includes a media box 395 that can include indexes to the region video samples for generating the region video $v_4$.

Further as shown in FIG. 3, the file 330 includes a track box 350 of a metadata track m for the ROIs. The track box 350 includes description (e.g., tref('cdsc',v)) to indicate that the referenced visual track of the ROIs is the main video v. The track box 350 includes a media box 355 to include description of the ROIs with reference to the main video v and association of the ROIs to other visual tracks. In an example, the media box 355 includes indexes to metadata samples in a temporal order. In another embodiment, the media box 355 includes a sample entry box, and the sample entry box includes indexes to multiple metadata samples. The sample entry box can be used to specify attributes that are common to the multiple metadata samples.

The ROIs can be specified at various levels. In an example, when the position and sizes of ROIs are static (don't change over time) with reference to the main video v, the ROIs can be specified at a sample entry level. For example, the sample entry box specifies the ROIs with reference to the main video v and association to other visual tracks. For example, a metadata sample entry box includes an identifier ROI-1 for the ROI 316, position of the ROI 316 in the visual view 310 (e.g., coordinates of the top-left corner), sizes of the ROI 316 (e.g., width and height), and a list of visual tracks (e.g., $v_2$ and $v_4$) that contribute to the ROI 316. Further, the metadata sample entry box includes an identifier ROI-2 for the ROI 317, position of the ROI 317 in the visual view 310 (e.g., coordinates of the top-left corner), sizes of the ROI 317 (e.g., width and height), and a list of visual tracks (e.g., $v_4$) that contribute to the ROI 317.

In another example, when the position and sizes of the ROI changes with reference to the main video v over time, the ROI can be specified at a sample level. For example, a first metadata sample for the time of the image shown in FIG. 3 includes an identifier ROI-1 for the ROI 316, position of the ROI 316 in the main visual view (e.g., coordinates of the top-left corner), sizes of the ROI 316 (e.g., width and height), and a list of visual tracks (e.g., $v_2$ and $v_4$) that contribute to the ROI 316; and a second metadata sample for a different time includes the identifier for the ROI 316, a new position of the ROI 316 in the main visual view (e.g., coordinates of the top-left corner), new sizes of the ROI 316 (e.g., width and height), and a list of visual tracks (e.g., only $v_2$).

In the FIG. 3 example, the track box 350 includes one metadata track for defining multiple ROIs. In other examples, the file 330 can include multiple metadata track boxes respectively for multiple ROIs.

The introduction of signaling for a main visual track containing multiple ROIs, the syntax and semantics for sample entry level description, the syntax and semantics for sample level description are disclosed in the U.S. Provisional Application No. 62/467,860 in the section of "Signaling for a Main Visual Track Containing Multiple ROIs", which is included in the Appendix A.

Figure 4:
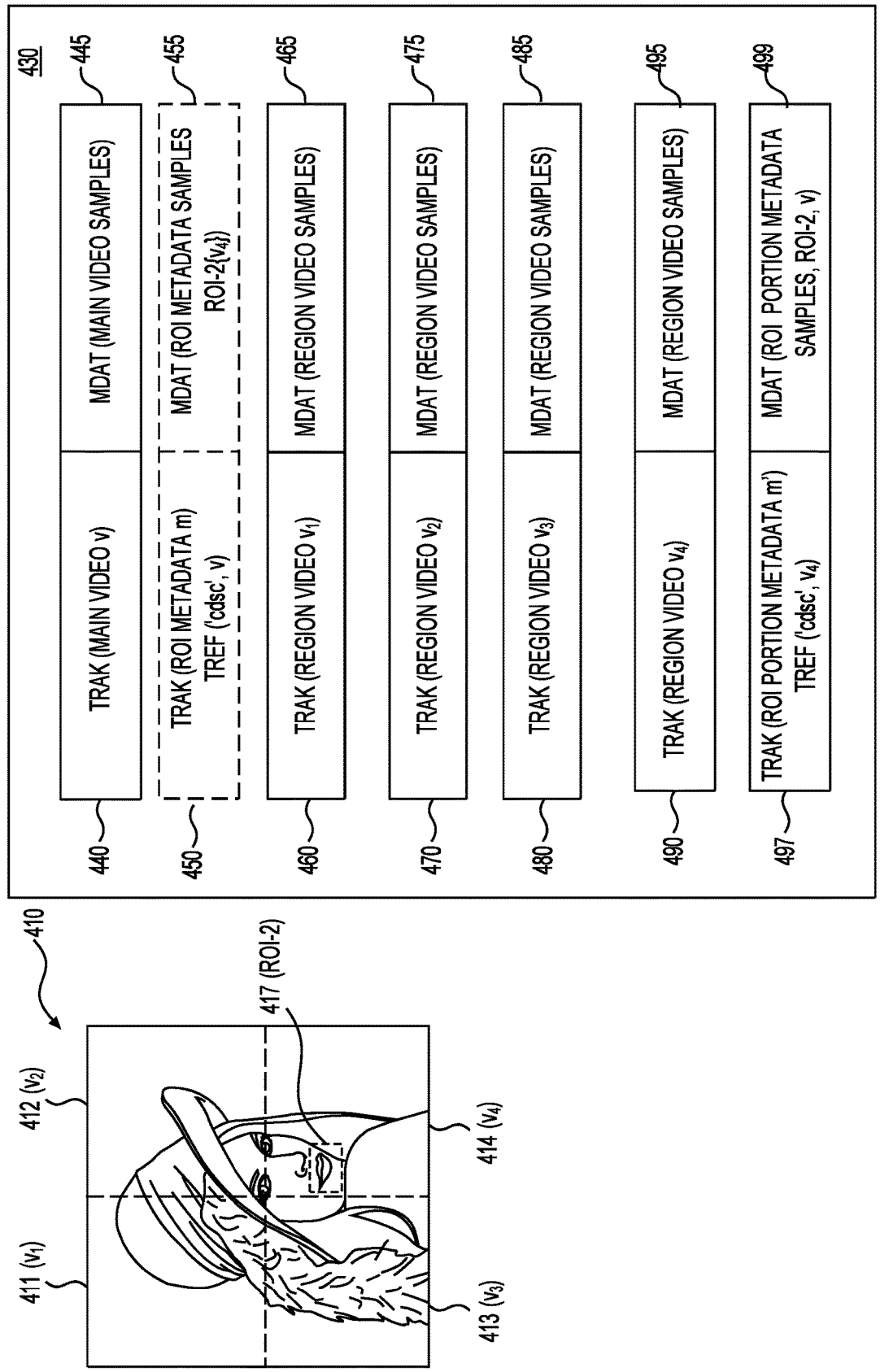

FIG. 4 shows a diagram illustrating a visual content and a corresponding media file 430 according to some embodiments of the disclosure. The visual content includes visual samples of different spatial attributes. For example, the visual content includes visual data for a main visual view 410, four region visual views 411-414, and an ROI 417 (ROI-2). The visual data for the main visual view 410 can form a visual track v that provides video in the main visual view 410. The visual data for the region visual view 411 can form a visual track $v_1$ that provides video in the region visual view 411, the visual data for the region visual view 412 can from a visual track $v_2$ that provides video in the region visual view 412, the visual data for the region visual view 413 can form a visual track $v_3$ that provides video in the region visual view 413, the visual data for the region visual view 414 can form a visual track $v_4$ that provides video in the region visual view 414.

In an example, the visual view of the referenced visual track (visual track v4) is described by sizes of the visual view 414, such as reference width of the visual view 414, reference_height of the visual view 414. The position of the ROI 417 in the visual view 414 is described using coordinates of the top-left corner with reference to the visual view 414, such as track_portion_top_left_x and track_portion_top_left_y (e.g., assuming the top-left corner of the visual view 414 is the origin); and the sizes of the ROI 417 is described using width and height, such as portion_width, portion_height.

It is noted that the positon of the ROI 417 with reference to the visual view 414 is different from with reference to the visual view 410. The sizes of the ROI 417 with reference to the visual view 414 can be different from with reference to the visual view 410, for example, when a portion of the ROI 417 is out of the visual view 414.

As shown in FIG. 4, the file 430 includes track boxes for visual tracks and metadata tracks. For example, the file 430 includes a track box 440 for the main visual track v. The track box 440 includes a media box 445 that can include indexes to the main video samples. Similarly, the file 430 includes track boxes 460, 470, 480 and 490 for the region visual tracks $v_1$ to $v_4$. The track box 460 includes a media box 465 that can include indexes to the region video samples for generating the region video $v_1$. The track box 470 includes a media box 475 that can include indexes to the region video samples for generating the region video $v_2$. The track box 480 includes a media box 485 that can include indexes to the region video samples for generating the region video $v_3$. The track box 490 includes a media box 495 that can include indexes to the region video samples for generating the region video $v_4$.

Further as shown in FIG. 4, the file 430 includes a track box 497 of a metadata track m' for the ROI 417. The track box 497 includes description to indicate that the referenced visual track of the ROI 417 is the region video $v_4$ (e.g., tref('cdsc',$v_4$)). The track box 497 includes a media box 499 to indicate that the referenced visual track $v_4$ contributes to the ROI 417 (ROI-2) in the main video v. In an example, the file 430 also includes a track box 450 of a metadata track m that references to the main visual track v. The track box 450 indicates that the region track v4 contributes to the ROI-2.

In an embodiment, the media box 499 includes a sample entry box, and the sample entry box includes indexes to multiple samples. The sample entry box can be used to specify attributes that are common to the multiple samples.

The signaling for the region video track contributing to the single ROI-2 can be specified at various levels. In an example, when the position and sizes of ROI are static (don't change over time) with reference to the region video $v_4$, the ROI-2 can be specified at a sample entry level. For example, the sample entry box specifies the ROI-2 with reference to the region video $v_4$ and association to other visual tracks. For example, a metadata sample entry box includes an identifier for the ROI 417, position of the ROI 417 in the region visual view 414, sizes of the ROI 417 in the region visual view 414.

In another example, when the position and sizes of the ROI 417 changes with reference to the main video v over time, the ROI 417 can be specified at a sample level. For example, a first metadata sample for the time of the image shown in FIG. 4 includes an identifier for the ROI 417, position of the ROI 417 in the region visual view 414 (with reference to the region visual view 414), sizes of the ROI 417 in the region visual view 414; and a second metadata sample for a different time includes the identifier for the ROI 417, a new position of the ROI 417 in the region visual view 414, new sizes of the ROI 417 in the region visual view 414.

The introduction of signaling for a region visual track containing a single ROI, the syntax and semantics for sample entry level description, the syntax and semantics for sample level description are disclosed in the U.S. Provisional Application No. 62/467,860 in the section of "Signaling for a Region Visual Track Contributing a single ROI", which is included in the Appendix A.

Figure 5:
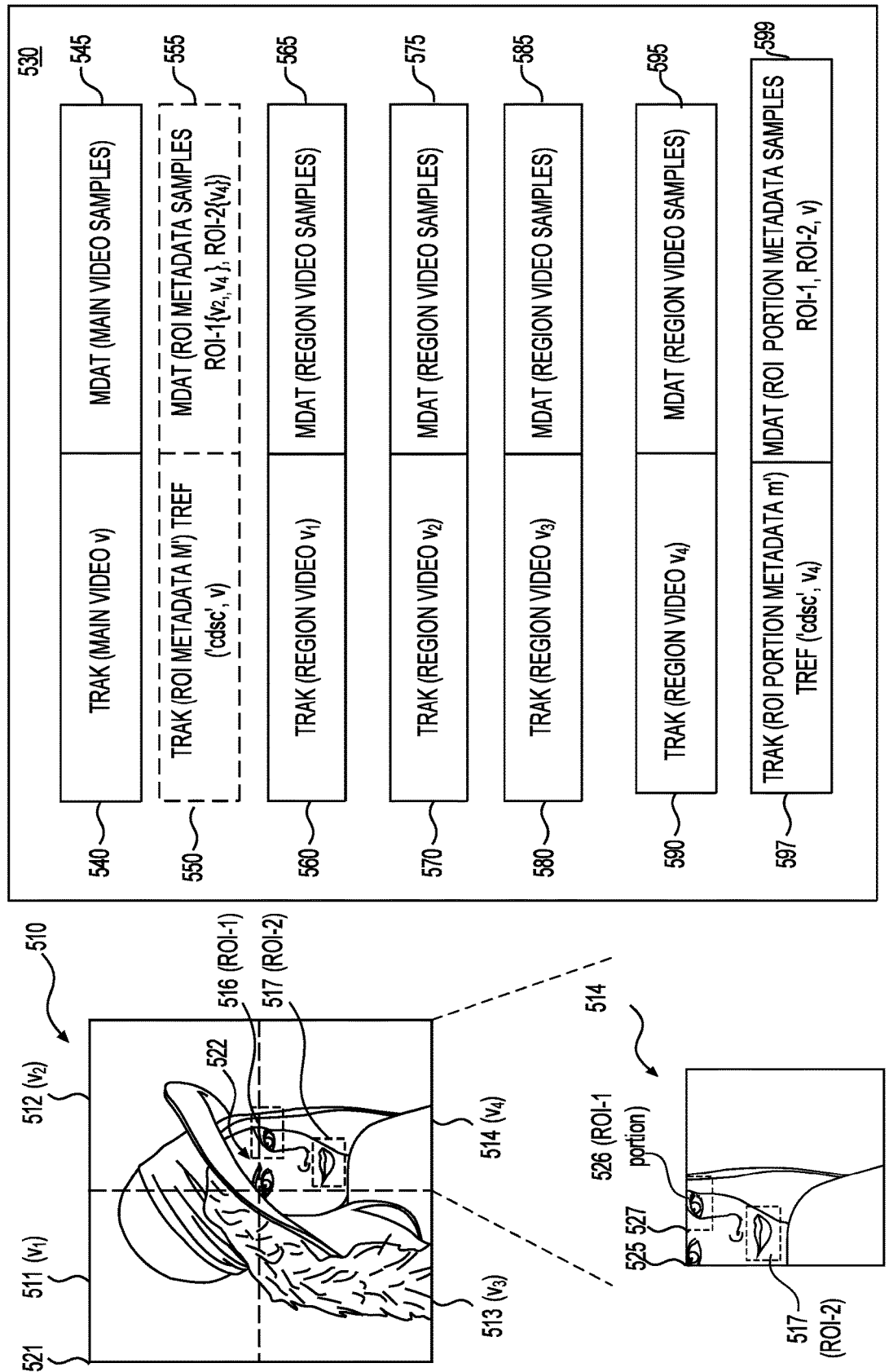

FIG. 5 shows a diagram illustrating a visual content and a corresponding media file 530 according to some embodiments of the disclosure. The visual content includes visual samples of different spatial attributes. For example, the visual content includes visual data for a main visual view 510, four region visual views 511-514, and a first ROI 516 (ROI-1) and a second ROI 517 (ROI-2). The visual data for the main visual view 510 can form a visual track v that provides video in the main visual view 510. The visual data for the region visual view 511 can form a visual track $v_1$ that provides video in the region visual view 511, the visual data for the region visual view 512 can from a visual track $v_2$ that provides video in the region visual view 512, the visual data for the region visual view 513 can form a visual track $v_3$ that provides video in the region visual view 513, the visual data for the region visual view 514 can form a visual track $v_4$ that provides video in the region visual view 514.

In an example, the visual view of the referenced visual track (visual track v4) is described by sizes of the region visual view 514, such as width of the region visual view 514, height of the region visual view 514. The positions of the ROIs in the region visual view 514 is described using coordinates of the top-level corner with reference to the region visual view 514; and the sizes of the ROIs in the region visual view 514 is described using portion width and portion height in the region visual view 514 (the portion of an ROI that is out of the region visual view 514 is not counted in).

It is noted that the positon of the ROIs with reference to the region visual view 514 is different from with reference to the visual view 510. The sizes of the ROIs with reference to the region visual view 514 can be different from with reference to the visual view 510, for example, when a portion of an ROI is out of the region visual view 514. In the FIG. 5 example, the ROI-1 516 is within the main visual view 510, and a portion of the ROI-1 that is referred to as ROI-1 portion 526 is within the region visual view 514. With reference to the main visual view 510, the top-left corner of the ROI-1 516 is shown as 522, and can be represented as coordinates (roi_portion_top_left_x, roi_portion_top_left_y), for example assuming the top-left corner 521 of the main visual view 510 is the origin. With reference to the region visual view 514, the top-left corner of the ROI-1 portion 526 is shown as 527, and can be represented as coordinates (track_portion_top_left_x, track_portion_top_left_y), for example, assuming the top-left corner 525 of the region visual view 514 is the origin. The width and height of the ROI-1 portion 526 can be represented by portion_width and portion_height in the FIG. 5 example.

As shown in FIG. 5, the file 530 includes track boxes for visual tracks and metadata tracks. For example, the file 530 includes a track box 540 for the main visual track v. The track box 540 includes a media box 545 that can include indexes to the main video samples. Similarly, the file 530 includes track boxes 560, 570, 580 and 590 for the region visual tracks $v_1$ to $v_4$. The track box 560 includes a media box 565 that can include indexes to the region video samples for generating the region video $v_1$. The track box 570 includes a media box 575 that can include indexes to the region video samples for generating the region video $v_2$. The track box 580 includes a media box 585 that can include indexes to the region video samples for generating the region video $v_3$. The track box 590 includes a media box 595 that can include indexes to the region video samples for generating the region video $v_4$.

Further as shown in FIG. 5, the file 530 includes a track box 597 of a metadata track m' for the ROIs. The track box 597 includes description to indicate that the referenced visual track of the ROIs is the region video $v_4$ (e.g., tref ('cdsc',$v_4$)). The track box 597 includes a media box 599 to indicate that the referenced visual track $v_4$ contributes to the ROI 516 (ROI-1) and the ROI 517 (ROI-2). The main video v contains the ROI-1 and the ROI-2. In an example, the file 530 also includes a track box 550 of a metadata track m that references to the main visual track v. The track box 550 indicates that the region track v4 contributes to the ROI-1 and ROI-2.

In an embodiment, the media box 599 includes a sample entry box, and the sample entry box includes indexes to multiple samples. The sample entry box can be used to specify attributes that are common to the multiple samples.

The signaling for the region video track contributing to the multiple ROIs can be specified at various levels. In an example, when the position and sizes of ROIs are static (don't change over time) with reference to the region video $v_4$, the ROIs can be specified at a sample entry level. For example, the sample entry box specifies the ROI-2 with reference to the region video $v_4$ and association to other visual tracks. For example, a metadata sample entry box includes an identifier for the ROI 517, position of the ROI 517 in the region visual view 514, sizes of the ROI 517 in the region visual view 514.

In another example, when the position and sizes of the multiple ROIs changes with reference to the main video v over time, the ROIs can be specified at a sample level. For example, a first metadata sample for the time of the image shown in FIG. 5 includes an identifier for the ROI 516, position of the ROI 516 in the region visual view 514 (with reference to the region visual view 514), sizes of the ROI 516 in the region visual view 514; and a second metadata sample for a different time includes the identifier for the ROI 516, a new position of the ROI 516 in the region visual view 514, new sizes of the ROI 516 in the region visual view 514.

The introduction of signaling for a region visual track containing multiple ROIs, the syntax and semantics for sample entry level description, the syntax and semantics for sample level description are disclosed in the U.S. Provisional Application No. 62/467,860 in the section of "Signaling for a Region Visual Track Contributing to Multiple ROIs", which is included in the Appendix A.

It is noted that Cartesian 2D coordinate system is used in the FIGS. 2-5. Further, in the FIGS. 2-5 examples, a region, such as a region of interest, a tile region, a sub-picture region, a partition region, and the like generally has a rectangular shape and the spatial attribute of the region can be specified by a corner position (e.g., a top-left corner) of the rectangular shape, a width and a height of the rectangular shape.

Figure 6:
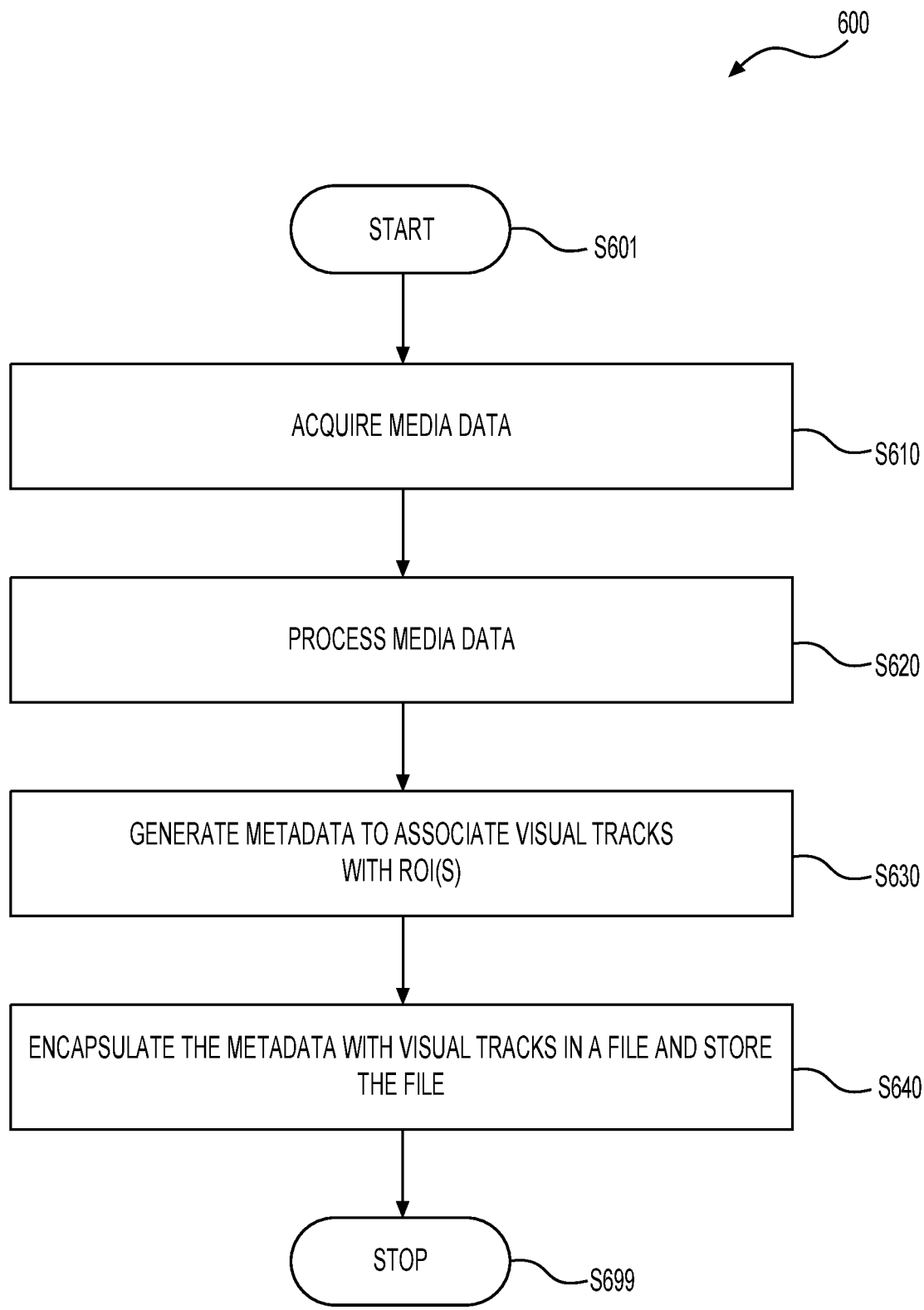
FIG. 6 shows a flow chart outlining a process example 600 according to an embodiment of the disclosure.

FIG. 6 shows a flow chart outlining a process example 600 according to an embodiment of the disclosure. In an example, the process 600 is executed by the source sub-system 110 in the FIG. 1 example. The process starts at S601 and proceeds to S610.

At S610, media data is acquired. In an example, the acquisition device 112 includes a Peloton cam for panorama view and tracking cams for tracking views. In another example, the acquisition device 112 includes a camera rig with multiple cameras to take images of various directions in a surrounding space. In some other embodiments, the media data is acquired from more than one source devices (for example, the acquisition device 112 or any other type of source device configured to provide media data), which should not be limited in this disclosure.

At S620, the visual data is processed to generate visual samples and form visual tracks. In an example, the processing circuitry 120 can stitch images taken from different cameras together to form a stitched image, such as an omnidirectional image, and the like. Then, the processing circuitry 120 can project the image according to suitable two-dimension (2D) plane to convert the image to 2D images. In an example, the 2D plane can be divided into sub-picture regions (partitions), and the processing circuitry 120 forms visual tracks of different visual views, such as the visual tracks v, and $v_1$-$v_4$ in the FIGS. 2-5 examples. The processing circuitry 120 then generates track boxes to respectively correspond to the visual tracks. A track box for a visual track can include data indexes that point to a subset of visual samples to form the visual track.

At S630, metadata that associates ROI(s) with visual tracks is determined. In an example, the processing circuitry 120 selects a referenced visual track for a ROI, such as a main visual track, a region visual track and the like. The processing circuitry 120 determines spatial attributes of the ROI with reference to the referenced visual track, such as position of the ROI with reference to visual view of the referenced visual track, sizes of the portion of the ROI in the visual view of the referenced visual track, and the like. In addition, the processing circuitry 120 determines a box level to include the ROI information. For example, when the positon and sizes of the ROI do not change in a temporal duration, the processing circuitry 120 determines to include the ROI information at a sample entry level that specifies common attributes for multiple samples in a temporal duration; and when the positon and sizes of the ROI change over time, the processing circuitry 120 determines to include the ROI information at a sample level that changes from sample to sample. The processing circuitry 120 then forms a metadata track to include timed metadata samples.

At S640, the visual tracks and the metadata tracks are encapsulated in a file. In an example, the visual tracks, the metadata tracks and other suitable tracks are encapsulated in a file (e.g., the file 230, the file 330, the file 430 and the file 530) that conforms to the ISOBMFF. The file is suitably stored in an example. Then the process proceeds to S699 and terminates.

Figure 7:
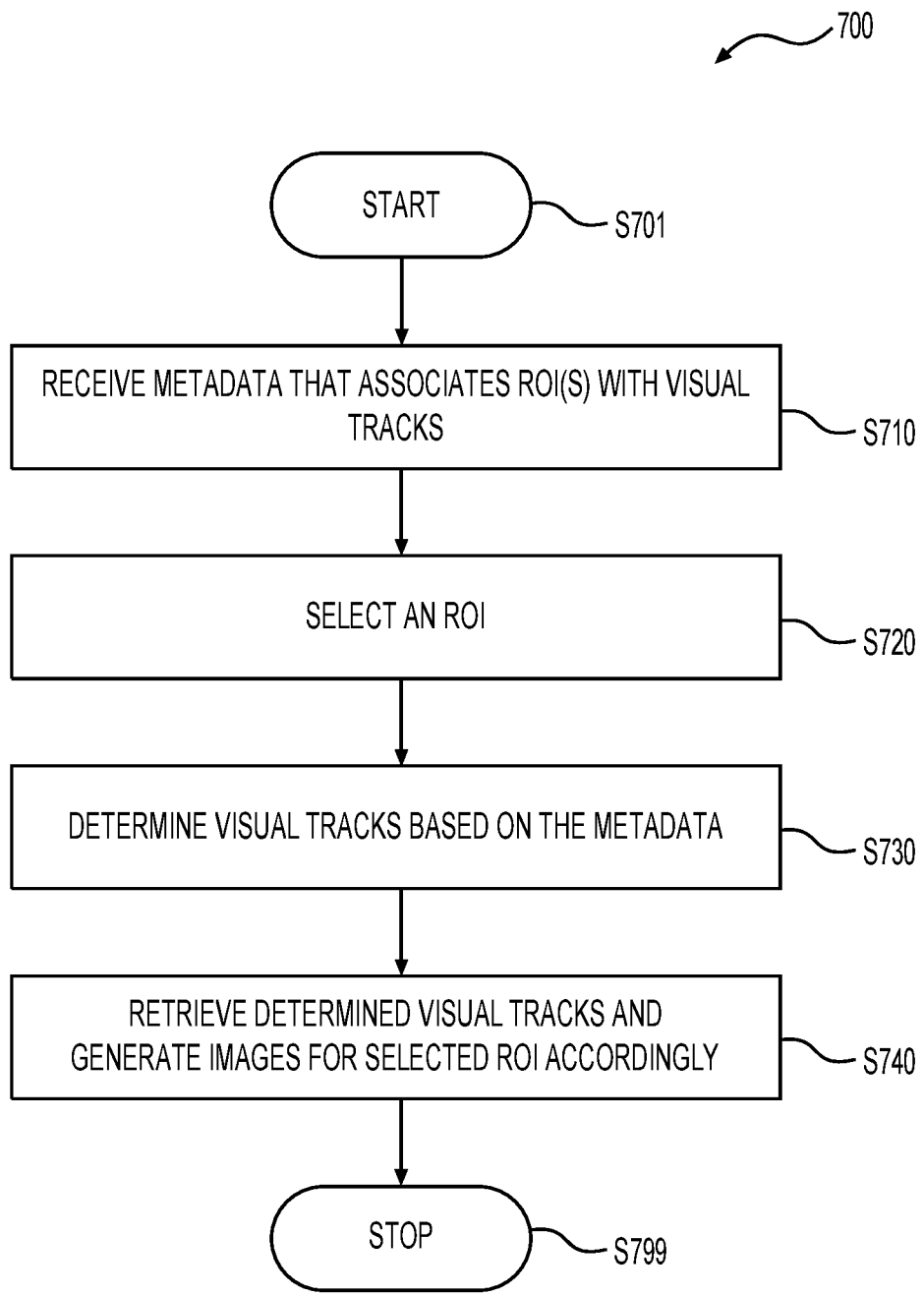
FIG. 7 shows a flow chart outlining a process example 700 according to an embodiment of the disclosure.

FIG. 7 shows a flow chart outlining a process example 700 according to an embodiment of the disclosure. In an example, the process 700 is executed by the rendering sub-system 160 in the FIG. 1 example. The process 700 starts at S701 and proceeds to S710.

At S710, metadata that associates ROIs with visual tracks is received. In an example, the source sub-system 110 generates a media file, such as the media file 230, the media file 330, the media file 430, the media file 530 and the like that includes metadata (e.g., metadata track) that associates ROIs with visual tracks of different visual views. In an embodiment, the processing circuitry 170 can parse the metadata track to extract the relationship of the ROI(s) to the visual tracks, such as spatial relationship of the ROI(s) to a referenced visual track, containing relationship or a contributing relationship of the visual tracks to the ROI(s).

At S720, an ROI is selected. In an example, the rendering sub-system 160 receives an input from a user interface that is indicative of a selected ROI by a user.

At S730, visual tracks to provide visual data for the ROI are determined. In an example, the processing circuitry 170 can determine, when the ROI is selected, visual tracks that can provide visual data for generating images of ROI based on the metadata that associates the ROIs with visual tracks.

At S740, the determined visual tracks are retrieved and images of the selected ROI are generated accordingly. In an example, the processing circuitry 170 can generate a request to request the visual data of the determined visual tracks. The request can be sent out by the interface circuitry 161. The interface circuitry 161 can then receive signals carrying the visual data of the determined visual tracks. Then, the processing circuitry 170 can generate images for the ROI based on the received visual data. Then the process proceeds to S799 and terminates.

Appendix A

1 Signaling for a Main Visual Track Containing a Single ROI
1.1 Introduction

An embodiment of the disclosure specifies timed metadata for signaling that a (main) visual track contains a single 2D ROI and a number of (region) visual tracks contribute to the ROI. More specifically, a timed metadata track m signals that the referenced (main) visual track v contains an ROI defined by its 2D Cartesian coordinates, identified by an ROI identifier id, and carried in the visual tracks $v_1, \ldots, v_n$.

Using video (instead of more general visual) content as an example, the metadata track can reference the main video track v, can carry the metadata for defining the ROI, and include identifications $v_1, \ldots, v_n$ of the region tracks that contribute to the ROI.
1.2 Sample Entry
1.2.1 Introduction
  Sample Entry Type: '2d1r'
  Container: Sample Description Box ('stsd')
  Mandatory: No
  Quantity: 0 or 1
  2D1RoiSampleEntry specifies reference Cartesian coordinates for an ROI that the referenced visual track contains.

An alternative definition of 2D1RoiSampleEntry further specifies an indication of whether the ROI changes over time in terms of its 2D location and size. If the ROI does not change, it specifies its location and size, as well as a number of region visual tracks that contribute to the ROI. In this case, no timed metadata shall be specified in the samples.
1.2.2 Syntax

```
aligned(8) class 2D1RoiSampleEntry extends
MetadataSampleEntry ('2d1r') {
    unsigned int(16) reference_width;
    unsigned int(16) reference_height;
}
```

If considering the situation where the (2D rectangular) ROI does not change over time in terms of its location and size, its metadata can be specified in the sample entry as follows.

```
aligned(8) class 2D1RoiSampleEntry extends
MetadataSampleEntry ('2dr1') {
    unsigned int(16) reference_width;
    unsigned int(16) reference_height;
    bit(7) reserved = 0;
    unsigned int(1) fixed_roi_flag;
    if (fixed_roi_flag == 1) {
        unsigned int(16) roi_id;
        unsigned int(16) top_left_x;
        unsigned int(16) top_left_y;
        unsigned int(16) width;
        unsigned int(16) height;
        unsigned int(16) num_roi_tracks;
        for (i = 1; i <= num_roi_tracks; i++) {
            unsigned int(32) track_id;
        }
    }
}
```

1.2.3 Semantics reference_width and reference_height give respectively the width and height of the reference rectangular space in which all ROI coordinates (top_left_x, top_left_y, width and height) are computed. These fields allow associating an ROI metadata track with visual tracks of different resolutions but representing the same visual source.

fixed_roi_tag equal to 1 specifies that the location and size of the ROI do not change over time.

roi_id specifies an identifier of the ROI. Its value shall be unique with respect to any other ROIs that the referenced track contains.

top_left_x and top_left_y give respectively the horizontal and vertical coordinate of the top-left corner of the rectangle region associated with the media sample of the referenced track.

width and height give respectively the width and height of the rectangular region associated with the media sample of the referenced track.

num_roi_tracks specifies the number of tracks whose contents contribute to the ROI. When it is equal to 0, this implies that there is no visual tracks (other than the referenced track containing the ROI) contributing to the ROI.
1.3 Sample Format
1.3.1 Introduction 2D1RoiSample specifies an identifier, a location and a size of an ROI, with respect to the reference Cartesian coordinates in the sample entry, as well as identifiers of a number of (region) visual tracks whose content contribute to the ROI. When the number of ROI contributing tracks is zero, it implies that there is no (known) region visual track that contributes to the ROI. When the ROI is static, its metadata can be signalled in the sample entry, as shown by the alternative definition above, and there is no need to signal it in the sample format. A yet another alternative definition of 2D1RoiSample further specifies the portion of the ROI that each contributing track contributes, with respect to the Cartesian coordinates of the ROI.
1.3.2 Syntax

```
aligned(8) class 2D1RoiSample( ){
    unsigned int(16) roi_id;
    unsigned int(16) top_left_x;
    unsigned int(16) top_left_y;
    unsigned int(16) width;
    unsigned int(16) height;
    unsigned int(16) num_roi_tracks;
    for (i =1; i <= num_roi_tracks; i++) {
        unsigned int(32) track_id;
    }
}
```

When the ROI is static, its metadata can be specified in the sample entry and there is no need to provide any metadata in the samples. To ensure this, the above syntax can be improved as follows.

```
aligned(8) class 2D1RoiSample(fixed_roi_tag){
   if (fixed_roi_tag == 0) {
      unsigned int(16) roi_id;
      unsigned int(16) top_left_x;
      unsigned int(16) top_left_y;
      unsigned int(16) width;
      unsigned int(16) height;
      unsigned int(16) num_roi_tracks;
      for (i =1; i <= num_roi_tracks; i++) {
         unsigned int(32) track_id;
      }
   }
}
```

The syntax can be enhanced further, as follows, to specify the portion of the ROI that each contributing track contributes, with respect to the Cartesian coordinates of the ROI.

```
aligned(8) class 2D1RoiSample( ){
   unsigned int(16) roi_id;
   unsigned int(16) top_left_x;
   unsigned int(16) top_left_y;
   unsigned int(16) width;
   unsigned int(16) height;
   unsigned int(16) num_roi_tracks;
   for (i =1; i <= num_roi_tracks; i++) {
      unsigned int(32) track_id;
      unsigned int(16) roi_portion top_left_x;
      unsigned int(16) roi_portion top_left_y;
      unsigned int(16) portion_width;
      unsigned int(16) portion_height;
   }
}
```

The syntax can be even further enhanced, as follows, to specify the portion of the ROI that each contributing track contributes, with respect to the Cartesian coordinates of the contributing track itself.

```
aligned(8) class 2D1RoiSample( ){
   unsigned int(16) roi_id;
   unsigned int(16) top_left_x;
   unsigned int(16) top_left_y;
   unsigned int(16) width;
   unsigned int(16) height;
   unsigned int(16) num_roi_tracks;
   for (i =1; i <= num_roi_tracks; i++) {
      unsigned int(32) track_id;
      unsigned int(16) roi_portion_top_left_x;
      unsigned int(16) roi_portion_top_left_y;
      unsigned int(16) portion_width;
      unsigned int(16) portion_height;
      unsigned int(16) track_portion_top_left_x;
      unsigned int(16) track_portion_top_left_y;
   }
}
```

Note that some of the information added into the definition above, such as track_portion_top_left_x, track_portion_top_left_y, portion width and portion height, can be omitted from here and signalled in a timed metadata track that references the ROI contributing visual track itself; see section 3.

1.3.3 Semantics roi_id specifies an identifier of the ROI. Its value shall be unique with respect to any other ROIs that the referenced track contains.

top_left_x and top_left$_{13}$ y give respectively the horizontal and vertical coordinate of the top-left corner of the rectangular ROI associated with the media sample of the referenced track.

width and height give respectively the width and height of the rectangular ROI associated with the media sample of the referenced track.

num_roi_tracks specifies the number of tracks whose contents contribute to the ROI. When it is equal to 0, this implies that there is no (possibly available or known) visual tracks, other than the referenced track containing the ROI, contributing to the ROI.

track_id specifies an identifier of a visual track whose content contributes the ROI. It shall not be equal to the identifier of the referenced (main) visual track.

roi_portion_top_left_x and roi_portion_top_left_y give respectively the horizontal and vertical coordinates of the top-left corner of the rectangular portion of the ROI the contributing track of track_id is to contribute, with respect to the Cartesian coordinates and size of the ROI (top_left_x, top_left_y, width and height).

portion_width and portion_height give respectively the width and height of the rectangular portion of the media sample of the track of track_id, with respect to the Cartesian coordinates and size of the ROI (top_left_x, top_left_y, width and height). Note that these can be alternatively defined, with respect to the reference coordinates defined in the sample entry, and moreover if ROIs are defined in terms of entire regions, i.e., either a region is entirely part of an ROI or no part of it belongs to the ROI, then these can be omitted. Also note that it is assumed that there is no scaling between the track portion and the ROI portion.

track_portion_top_left_x and track_portion_top_left_y give respectively the horizontal and vertical coordinates of the top-left corner of the rectangular portion of the media sample of the contributing track of track_id, within the media sample itself.

2 Signaling for a Main Visual Track Containing Multiple ROIs 2.1 Introduction

When a main visual track contains more than one ROIs, it may be convenient to signal them all together within a single timed metadata track, even though it is possible to use multiple timed metadata tracks, one for each ROI.

An embodiment of the disclosure specifies timed metadata for signaling that a (main) visual track contains a number of 2D ROIs and a number of (region) visual tracks contribute to each of the ROIs. More specifically, a timed metadata track m signals that the referenced (main) video track v contains a number of ROIs, each of which is defined by its 2D Cartesian coordinates, identified by an ROI identifier id, and carried in the video tracks $v_1, \ldots, v_n$.

Using video (instead of more general visual) content as an example, the metadata track m can reference the main video track v, carry the metadata for defining k ROIs, and include k sets of identifications $\{v_{11}, \ldots, v_{1n_1}\}, \ldots, \{v_{k1} \ldots, v_{kn_k}\}$ of the region tracks that contribute to the k ROIs.

The embodiment disclosed in the rest of this section is on top of the base definitions of the sample entry and samples in the single ROI case. Other alternative, enhancement and variation embodiments can be obtained based on the similar alternative, enhanced and variant definitions in the single ROI case.

2.2 Sample Entry 2.2.1 Introduction

Sample Entry Type: '2dmr'
Container: Sample Description Box ('stsd')
Mandatory: No
Quantity: 0 or 1

2DmRoiSampleEntry specifies reference Cartesian coordinates for a number of ROIs that the referenced visual track contains.

2.2.2 Syntax

```
aligned(8) class 2DmRoiSampleEntry extends
MetadataSampleEntry ('2dmr') {
   unsigned int(16) reference_width;
   unsigned int(16) reference_height;
}
```

2.2.3 Semantics reference_width and reference_height give respectively the width and height of the reference rectangular space in which all ROI coordinates (top_left_x, top_left_y, width and height) are computed. These fields allow associating an ROI metadata track with visual tracks of different resolutions but representing the same visual source.

2.3 Sample Format 2.3.1 Introduction

2DmRoiSample specifies a number of ROIs, and for each of them, an identifier, a location and a size of the ROI, with respect to the reference Cartesian coordinates in the sample entry. It also specifies identifiers of a number of (region) visual tracks whose content contribute to the ROI. When the number of tracks contributing to an ROI is zero, it means that there is no (known) visual track that contributes to that ROI.

2.3.2 Syntax

```
aligned(8) class 2DmRoiSample( ){
   unsigned int(16) num_rois;
   for (j =1;j <= num_rois; j++) {
      unsigned int(16) roi_id;
      unsigned int(16) top_left_x;
      unsigned int(16) top_left_y;
      unsigned int(16) width;
      unsigned int(16) height;
      unsigned int(16) num_roi_tracks;
      for (i =1; i +21=num_roi_tracks; i++) {
         unsigned int(32) track_id;
      }
   }
}
```

2.3.3 Semantics num_rois specifies the number of ROIs associated with the media sample of the referenced track.

roi_id specifies an identifier of an ROI. Its value shall be unique with respect to any other ROIs that the referenced track contains.

top_left_x and top_left_y give respectively the horizontal and vertical coordinate of the top-left corner of a rectangular ROI associated with the media sample of the referenced track.

width and height give respectively the width and height of a rectangular ROI associated with the media sample of the referenced track.

num_roi_tracks specifies the number of tracks whose contents contribute to an ROI. When it is equal to 0, this implies that there is no (possibly available or known) visual tracks, other than the referenced track containing the ROI, contributing to the ROI.

track_id specifies an identifier of a visual track whose content contributes an ROI.

3 Signaling for a Region Video Track Contributing to a Single ROI 3.1 Introduction An embodiment of the disclosure specifies timed metadata track for signaling that a (region) visual track contributes a portion to a single 2D ROI. More specifically, a timed metadata track m' signals that the referenced (region) visual track v' contributes to an ROI, identified by an ROI identifier id, of a (main) visual track v, and the portion contributed from v' is defined with the 2D Cartesian coordinates of both the ROI and the track v' itself.

Using video (instead of more general visual) content as an example, the (ROI portion) metadata track m' can reference the region video track v', and carry an identifier roi_id of an ROI in a main video track v that the region track contributes to and the metadata for defining the portion of the region contributed to the ROI. If there were an ROI metadata track m associated with the main visual track v that contains the ROI contributed by region tracks $v_1, \ldots, v_n$, then the region track v' would have to be one of these region tracks.

More embodiments can be obtained based on optimization, enhancement and variation can be obtained with considerations to the ones for signalling a main visual track containing a single ROI, such as the ROI being static, and the contributed portion is time invariant.

3.2 Sample entry 3.2.1 Introduction

Sample Entry Type: '2dr1'
Container: Sample Description Box ('stsd')
Mandatory: No
Quantity: 0 or 1

2DRoi1 SampleEntry specifies reference Cartesian coordinates for an ROI that the referenced visual track contributes to.

3.2.2 Syntax

```
aligned(8) class 2DRoi1SampleEntry extends
MetadataSampleEntry ('2dr1') {
   unsigned int(16) reference_width;
   unsigned int(16) reference_height;
}
```

3.2.3 Semantics reference_width and reference_height give respectively the width and height of the reference rectangular space in which all ROI coordinates (top_left_x, top_left_y, width and height) are computed. These fields allow associating an ROI metadata track with visual tracks of different resolutions but representing the same visual source.

3.3 Sample Format 3.3.1 Introduction

2DRoi1Sample specifies an identifier of an ROI, an identifier of a main visual track containing the ROI, a location and a size of a portion of the ROI that the associated media sample is to contribute to, and a location of the portion in the associated media sample.

3.3.2 Syntax

```
aligned(8) class 2DRoi1Sample( ){
   unsigned int(16) roi_id;
   unsigned int(32) track_id;
   unsigned int(16) roi_portion_top_left_x;
   unsigned int(16) roi_portion_top_left_y;
   unsigned int(16) portion_width;
   unsigned int(16) portin_height;
```

```
    unsigned int(16) track_portion_top_left_x;
    unsigned int(16) track_portion_top_left_y;
}
```

3.3.3 Semantics roi_id specifies an identifier of the ROI. Its value shall be unique with respect to any other ROIs that the referenced track contains.

track_id specifies an identifier of the main visual track that contains the ROI.

roi_portion_top_left_x and roi_portion_top_left_y give respectively the horizontal and vertical coordinates of the top-left corner of the rectangular portion of the ROI the referenced track of track_id is to contribute, with respect to the Cartesian coordinates and size of the ROI (top_left_x, top_left_y, width and height).

portion_width and portion height give respectively the width and height of the rectangular portion of the media sample of the track of track_id, with respect to the Cartesian coordinates and size of the ROI (top_left_x, top_left_y, width and height). Note that this can be alternatively defined, with respect to the reference coordinates defined in the sample entry. Also note that it is assumed that there is no scaling between the track portion and the ROI portion.

track_portion_top_left_x and track_portion_top_left_y give respectively the horizontal and vertical coordinates of the top-left corner of the rectangular portion of the media sample of the contributing track of track_id, within the media sample itself.

4 Signaling for a Region Video Track Contributing to Multiple ROIs

4.1 Introduction

When a region visual track contributes more than one ROIs, it can be more compact and convenient to signal these ROIs all together within a single timed metadata track, even though it is possible to use multiple timed metadata tracks associated with the same region visual track, one for each ROI.

An embodiment of the disclosure specifies timed metadata for signaling that a (region) visual track contributes to a number of 2D ROIs. More specifically, a timed metadata track m' signals that the referenced (region) visual track v' contributes to a number of ROIs, and for each contributed ROI identified by an ROI identifier id, of a (main) visual track v, the portion contributed from v' is defined with the 2D Cartesian coordinates of both the ROI and the track v' itself.

Using video (instead of more general visual) content, the metadata track m references the main video track v, carries the metadata for defining k ROIs, and includes k sets of identifications $\{v_{11}, \ldots, v_{1n_1}\}, \ldots, \{v_{k1}, \ldots, v_{kn_k}\}$ of the region tracks that contribute to the k ROIs.

4.2 Sample Entry

4.2.1 Introduction

Sample Entry Type: '2drm'

Container: Sample Description Box ('stsd')

Mandatory: No

Quantity: 0 or 1

2DRoimSampleEntry specifies reference Cartesian coordinates for a number of ROIs the referenced visual track contributes to.

4.2.2 Syntax

```
aligned(8) class 2DRoimSampleEntry extends
    MetadataSampleEntry ('2drm') {
    unsigned int(16) reference_width;
    unsigned int(16) reference_height;
}
```

4.2.3 Semantics reference_width and reference_height give respectively the width and height of the reference rectangular space in which all ROI coordinates (top_left_x, top_left_y, width and height) are computed. These fields allow associating an ROI metadata track with visual tracks of different resolutions but representing the same visual source.

4.3 Sample Format

4.3.1 Introduction

2DRoimSample specifies a number of ROIs the associated media sample contributes to. For each of the contributed ROIs, it specifies an identifier of the ROI, an identifier of a main visual track containing the ROI, a location and a size of the portion of the ROI that the associated media sample is to contribute to, and a location of the portion in the associated media sample.

When the number of ROIs the associated media sample contributes to is zero, this means that there is no (known) ROI that the sample contributes to.

4.3.2 Syntax

```
aligned(8) class 2DRoimSample( ){
    unsigned int(16) num_contributed_rois;
    for (i =1; i <= num_contributed_rois; i++) {
        unsigned int(16) roi_id;
        unsigned int(32) track_id;
        unsigned int(16) roi_portion_top_left_x;
        unsigned int(16) roi_portion_top_left_y;
        unsigned int(16) portion_width;
        unsigned int(16) portin_height;
        unsigned int(16) track_portion_top_left_x;
        unsigned int(16) track_portion_top_left_y;
    }
}
```

4.4 Semantics num_contributed_rois specifies a number of ROIs the associated media sample contribute its content to.

roi_id specifies an identifier of the ROI. Its value shall be unique with respect to any other ROIs that the referenced track contains.

track_id specifies an identifier of the main visual track that contains the ROI.

roi_portion_top_left_x and roi_portion_top_left_y give respectively the horizontal and vertical coordinates of the top-left corner of the rectangular portion of the ROI the referenced track of track_id is to contribute, with respect to the Cartesian coordinates and size of the ROI (top_left_x, top_left_y, width and height).

portion_width and portion_height give respectively the width and height of the rectangular portion of the media sample of the track of track_id, with respect to the Cartesian coordinates and size of the ROI (top_left_x, top_left_y, width and height). Note that this can be alternatively defined, with respect to the reference coordinates defined in the sample entry. Also note that it is assumed that there is no scaling between the track portion and the ROI portion.

track_portion_top_left_x and track_portion_top_left_y give respectively the horizontal and vertical coordinates of the top-left corner of the rectangular portion of the media sample of the contributing track of track_id, within the media sample itself.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
    interface circuitry configured to receive signals specifying at least a reference visual track, a plurality of contributing visual tracks, and a metadata track, wherein:
        the reference visual track comprises a sequence of image samples; and
        at least the plurality of contributing visual tracks and the metadata track are both in a same file,
    the metadata track including metadata that defines at least a region of interest, the metadata including:
        a region of interest identifier identifying the region of interest,
        a first identifier identifying the reference visual track that provides a reference visual view indicative of a spatial scope of the sequence of image samples in which the region of interest is included so that the reference visual track need not reference the plurality of contributing visual tracks, and
        a plurality of second identifiers in association with the region of interest identifier, the second identifiers identifying the plurality of contributing visual tracks that provide corresponding contributing visual views, at least a portion of each contributing visual view being within the region of interest, and
    the each of the plurality of contributing visual tracks including:
        the associated second identifier identifying the contributing visual track, and
        visual data corresponding to at least the portion of the associated contributing visual view, wherein the visual data is different than the sequence of image samples; and
    processing circuitry configured to:
        when the region of interest is selected in response to a user input,
        identify the plurality of contributing visual tracks for providing the visual data according to the metadata; and
        generate images for the region of interest based on the visual data retrieved from the plurality of contributing visual tracks for playback by the apparatus.

2. The apparatus of claim 1, wherein
    the received signals further specify a second metadata track that defines at least a second region of interest by associating the second region of interest with at least one second identifier of the plurality of second identifiers; and
    the processing circuitry is configured to, according to the second metadata track when the second region of interest is selected in response to the user input, obtain second visual data for the second region of interest from the contributing visual track identified by the at least one second identifier.

3. The apparatus of claim 1, wherein
    the interface circuitry is configured to receive the file, wherein the file includes the reference visual track in addition to the plurality of contributing visual tracks and the metadata track.

4. The apparatus of claim 3, wherein
    the interface circuitry is configured to obtain the plurality of second identifiers associated with the region of interest in a sample level portion or a sample entry level portion of the metadata track.

5. The apparatus of claim 1, wherein the contributing visual track further includes the region of interest identifier identifying the region of interest.

6. The apparatus of claim 1, wherein the processing circuitry is further configured to perform at least one of a stitching operation and a projection operation.

7. The apparatus of claim 6, wherein performing the stitching operation comprises stitching images from at least two of the plurality of contributing visual tracks to form stitched images, wherein each of the at least two contributing visual tracks comprise images acquired from an associated different camera, and the images from the at least two contributing visual tracks overlap at least partially.

8. The apparatus of claim 6, wherein performing the projection operation comprises projecting the stitched images to a two-dimensional (2D) plane to generate 2D images, wherein the stitched images comprise omnidirectional images.

9. An apparatus, comprising:
    processing circuitry configured to:
        form a reference visual track that comprises a sequence of image samples and provides a reference visual view indicative of a spatial scope of the sequence of image samples, and
        form a plurality of contributing visual tracks that provide a contributing visual view;
        generate a metadata track including metadata that defines at least a region of interest, the metadata including:
            a region of interest identifier identifying the region of interest,
            a first identifier identifying the reference visual track so that the reference visual track need not reference the plurality of contributing visual tracks, the region of interest being included in the reference visual view, and
            a plurality of second identifiers in association with the region of interest identifier, the second identifiers identifying the plurality of contributing visual tracks that provide corresponding contributing visual views, at least a portion of each contributing visual view being within the region of interest, and
        the each of the plurality of contributing visual tracks including:
            the associated second identifier identifying the contributing visual track, and
            visual data corresponding to at least the portion of the associated contributing visual view, wherein the visual data is different than the sequence of image samples; and
        encapsulate the metadata track with the reference visual track and the plurality of contributing visual tracks in a file; and memory circuitry configured to store the file containing the metadata track, the reference visual track, and the plurality of contributing visual tracks.

10. The apparatus of claim 9, wherein the processing circuitry is configured to:
receive a request for the visual data for the region of interest;
identify the plurality of contributing visual tracks for providing the visual data based on the metadata in response to the request; and
transmit, via interface circuitry, the visual data from the plurality of contributing visual tracks.

11. The apparatus of claim 9, wherein the processing circuitry is configured to:
generate a second metadata track that defines a second region of interest by associating the second region of interest with at least one second identifier of the plurality of second identifiers identifying the contributing visual track for providing second visual data for the second region of interest.

12. The apparatus of claim 9, wherein the processing circuitry is configured to:
form the metadata track that includes the plurality of second identifiers associated with the region of interest in a sample level portion or a sample entry level portion of the metadata track.

13. The apparatus of claim 9, wherein the contributing visual track further includes the region of interest identifier identifying the region of interest.

14. A method, comprising:
receiving, by interface circuitry of an apparatus, signals specifying at least a reference visual track, a plurality of contributing visual tracks, and a metadata track, wherein:
the reference visual track comprises a sequence of image samples; and
at least the plurality of contributing visual tracks and the metadata track are both in a same file,
the metadata track including metadata that defines at least a region of interest, the metadata including:
a region of interest identifier identifying the region of interest,
a first identifier identifying the reference visual track that provides a reference visual view indicative of a spatial scope of the sequence of image samples in which the region of interest is included so that the reference visual track need not reference the plurality of contributing visual tracks, and
a plurality of second identifiers in association with the region of interest identifier, the second identifiers identifying the plurality of contributing visual tracks that provide corresponding contributing visual views, at least a portion of each contributing visual view being within the region of interest, and
the each of the plurality of contributing visual tracks including:
the associated second identifier identifying the contributing visual track, and
visual data corresponding to at least the portion of the associated contributing visual view, wherein the visual data is different than the sequence of image samples; and
when the region of interest is selected in response to a user input,
identifying the plurality of contributing visual tracks for providing the visual data according to the metadata, and
generating images for the region of interest based on the visual data retrieved from the plurality of contributing visual tracks for playback by the apparatus.

15. The method of claim 14, wherein the receiving the signals carrying the metadata comprises:
receiving the file, wherein the file includes the reference visual track in addition to the plurality of contributing visual tracks and the metadata track.

16. The method of claim 14, further comprising:
obtaining the plurality of second identifiers associated with the region of interest in a sample level portion or a sample entry level portion of the metadata track.

17. The method of claim 14, wherein the contributing visual track further includes the region of interest identifier identifying the region of interest.

* * * * *